United States Patent Office 3,549,584
Patented Dec. 22, 1970

3,549,584
NO-BAKE RESIN BINDERS
John C. Sekera, Chicago, Ill., assignor to CPC International Inc., a corporation of Delaware
No Drawing. Filed Dec. 26, 1967, Ser. No. 693,116
Int. Cl. C08g *37/16, 37/36*
U.S. Cl. 260—38                                42 Claims

ABSTRACT OF THE DISCLOSURE

Covers a resin useful as a no-bake binder for sand in a foundry process. Said resin comprises a three component resin system including furfuryl alcohol, formaldehyde and phenol. Also covers a method of preparing said resin in a two-step process, use of the resin in a foundry process as a binder, and resultant sand cores and molds derived from the resin binding agent.

---

The cores for use in making metal castings are normally prepared from mixtures of an aggregate material, for example, sand which has been combined with a binding amount of polymerizable or curable binder. Often, other materials, such as iron oxide, ground flax fibers, and the like are also included in these mixtures. The role of the binder is to permit such a foundry mix to be molded or shaped to the desired form and thereafter cured to form a self-supporting structure.

As noted above, in almost all cases sand is used at least as the major proportion of the aggregate material. After the sand and binder have been mixed, the resulting foundry sand mix is rammed, blown or otherwise introduced into a pattern, thereby assuming the shape defined by the adjacent surfaces of the pattern. Then, by the use of a catalyst or polymerization accelerator introduced before or after the sand mix has been introduced into the pattern, and/or the use of heat, the polymerizable binder is caused to polymerize, thereby converting the formed, uncured, plastic, foundry sand mix into a hard, solid, cured state. This hardening can be accomplished in the original pattern, in a gasing chamber, or in a holding pattern.

While many of the prior art foundry processes are effective, the great majority of core binders require cure by being subjected to elevated temperatures in the range of 225° F.–500° F. This in turn requires that heating facilities be available. Also, in many instances it is a requisite that the green cores be maintained in the original molds or patterns during the heating period since many of the heat curable binders do not impart sufficient green strength to cause the green cores to retain their desired shape without external support until such times as a final cure can be effected.

Much developmental effort has been exerted in an effort to prepare cores without resorting to use of heat. The aim is to prepare a resin binder which will be capable of curing at room temperature, say in the neighborhood of 45°–120° F., and more often within the range of 60°–90° F. These prior art compositions developed for this purpose have suffered from one or more deficiencies. For example, prior art no-bake binders or those developed for cure at room temperatures have suffered from lack of ability to rapidly impart green strength or stripping strength to cores, lack of tensile strength, short bench life of foundry mixes, high toxicity, an inability to combine well with sand or sand aggregates containing small amounts of other particulate materials, high sensitivity to moisture, undue odor particularly when undergoing cure, etc.

Many resins developed as no-bake or cold set binders contain varying degrees of nitrogen in the resin structure. While these resins do appear to overcome most of the objections enumerated above, it has been found that they have a definite shortcoming in that they tend to create pinholes in the castings. This pinholing effect is apparent even when nitrogen is present at very low percentages in the resin.

Thus, it can be seen that there exists a recognizable market for a room temperature curing binder which would not have the above enumerated shortcomings, and particularly for a nitrogen-free no-bake resin binder, which binder overcomes the deficiency of introducing pinholes in castings and also does not suffer from any of the above mentioned drawbacks or others.

In view of the above, it therefore becomes an object of the invention to provide a nitrogen-free, no-bake resin useful as a binder for sand in a foundry process.

A further object of the invention is to provide a novel scheme of making the above three-component resin systems in a two-step process.

A still further object of the present invention is to provide a method for producing foundry cores and molds composed principally of sand through use of the above resin binder, which process is simple in execution and commercially feasible.

Another object of the invention is to provide cured sand molds and cores suitable for metal casting practices which have high strength and other desirable properties, which cores and molds are formed by means of a unique resinous binder.

Yet another object of the invention is to provide a novel resinous core binder which rapidly cures at room temperature by means of a wide variety of catalysts or acid cure accelerators.

A specific object of the invention is to provide a room temperature curing resin binder useful in the foundry process, which resin both during storage and period of curing does not exhibit a toxic odor such as a characteristic formaldehyde odor.

Other objects will appear hereinafter.

In accordance with the invention a novel resin useful as a no-bake binder for sand or other refractory materials in a foundry process has been discovered. In its broadest aspects, this resin comprises a three component resin system including furfuryl alcohol, formaldehyde and phenol. The uniqueness of the resin is particularly ascribed to its mode of preparation which involves formation in a sequential two-step process involving first reaction of furfuryl alcohol with an excess of formaldehyde followed by reaction of phenol with the free formaldehyde present after completion of the first reaction. The invention is also concerned with the use of the above resin as a sand binder in a foundry process, and with the resultant cured sand cores and molds produced therefrom.

For purpose of simplicity, the term "core" will be used hereinafter as encompassing casting forms. It will be understood that this term as used herein is applicable in its generic sense to mean a casting form which includes both molds and cores, the invention not being limited to formation of the latter. Similarly, the word "pattern" as used herein includes both mold patterns and core boxes. Also, the details of the invention will be described with respect to sand as a refractory material. It is understood other known foundry refractories may be combined with the resin binders defined here.

PREPARATION OF RESIN BINDER

The resins of the invention as noted above are prepared in a sequential step-wise process involving an initial reaction of furfuryl alcohol and formaldehyde followed by a second reaction of phenol in the unreacted formaldehyde from the first reaction. It has been found that this sequence of steps is particularly critical, and other modes of preparing the three component resin system have been found to be unsatisfactory for one or more reasons, as will be noted below.

Furfuryl alcohol is a well-known article of commerce and it needs little exemplification. It should be understood, of course, that the term "furfuryl alcohol" also includes partially polymerized furfuryl alcohol or other modified furfuryl alcohol sources, as long as these materials are still reactive with formaldehyde. The formaldehyde ingredient may be supplied by utilizing paraformaldehyde. Greatly preferred are aqueous solutions of formaldehyde, such as Formalin. Commercial sources of Formalin generally supplied contain about 37% or 45% by weight of formaldehyde.

The amount of furfuryl alcohol utilized in relation to the formaldehyde could be somewhat varied. However, to produce suitable resinous binders here generally 85–95% by weight of furfuryl alcohol should be reacted with 5–15% by weight of formaldehyde, with the foregoing percentages being based on the combined weight of the furfuryl alcohol and formaldehyde in terms of these two active ingredients. When Formalin is used as the source of formaldehyde generally 70–90% by weight of furfuryl alcohol is reacted with 10–30% by weight of a Formalin source containing 35–45% by weight of formaldehyde dissolved in water. This first step of the overall reaction should be effected under acidic conditions, usually at a pH less than 3, and most often at a pH ranging from about 2 to 3. The typical pH range for effecting this reaction is from about 2.2 to about 2.6.

The furfuryl alcohol and formaldehyde reactants are usually heated to effect the appropriate reaction at a temperature ranging from about 80° C. to about 110° C. for a period of time ranging from about 1 to about 5 hours. Preferably the temperature of heat ranges from about 90° C. to about 100° C., and the duration of heating ranges from about 1 to about 3 hours. When this step of the process is properly carried out the free formaldehyde content present at termination of the reaction usually ranges from about 2 to about 5% based on the weight of the reaction mass. More often the free formaldehyde content falls within the range of about 2.5 to about 4.5%.

After the formaldehyde and furfuryl alcohol have been charged to the reaction vessel the pH is adjusted to within the aforementioned range by addition of appropriate amount of acid. The acid also acts as a catalyst to effect the polymerization reaction here. Such acids as oxalic acid, para-toluene sulfonic acid, phosphoric acid, sulfuric acid, etc. may be used here. It has been determined that use of oxalic acid appears to yield best results in that no precipitant is noted in the finally prepared liquid resin.

The second step of the overall process of the invention involves reaction of phenol with unreacted formaldehyde present from the first reactive step. Usually sufficient phenol is added to the reaction vessel to provide a mole ratio of formaldehyde already present to phenol at the initiation of this step to fall within the range of 2–3 moles formaldehyde per mole of phenol. More preferably the second phase of the process of the invention is carried out by reacting 2.5–2.9 moles of formaldehyde with 1 mole of phenol. In a typical reaction the mole ratio of formaldehyde to phenol at the start of the reaction was about 2.7 moles formaldehyde per mole of phenol.

The reaction between phenol and formaldehyde is best carried out under basic conditions, that is, at a pH greater than 7. Most preferably the pH during this phase of the process falls within the range of 9–10. In a typical run the pH will fall within about 9.5–10.0. The polymer product of step one is therefore adjusted to the basic side by addition of appropriate amounts of base, such as sodium hydroxide, potassium hydroxide, etc. The step of reaction of formaldehyde and phenol to form the three-component resin system is then completed by heating for the appropriate amount of time. Conditions of temperature and duration of heating time are essentially the same as described with reference to the first step of the process.

It is important that the formaldehyde:phenol ratio be as just stated. If insufficient formaldehyde is used the resultant resin binder has poor cure rate, and the core form therefrom has poor strength and scratch hardness. On the other hand, if excess formaldehyde is present in the second step of the invention, a characteristic undesired odor of free formaldehyde is noted at the completion of the reaction with phenol.

After the first phase of the reaction, or else when the process is considered complete after reaction of phenol and formaldehyde, the liquid resin may be dehydrated to some degree in order to remove excess water which will interfere with subsequent use of the resin as a binder. It is important that the dehydration not be carried to the point where the liquid resin becomes excessively viscous to the point where it cannot be practically utilized.

If the just enumerated process variables are carefully carried out, it has been found that the final product has only minimal free formaldehyde content, and little, if any, characteristic formaldehyde odor. Usually, at the completion of the reaction the formaldehyde content is less than 1% by weight based on the weight of the resin, and more often falls within the range of 0.25–0.50% by weight.

By way of a brief summary then, a typical three component resin system of the invention can be derived by reacting in the sequential two-step process described above 70–80 parts of furfuryl alcohol, 15–25 parts of Formalin, and 3–10 parts by weight of phenol.

The following examples illustrate preparation of a typical no-bake resin binder of the invention. It is understood, of course, that these examples are merely illustrative, and that the invention is not to be limited thereto. Percentages and parts shown below are expressed in terms of weight unless otherwise stated.

EXAMPLE I 75.93 parts of furfuryl alcohol and 19.90 parts of Formalin (45% formaldehyde) were charged to reaction vessel and the pH adjusted within the range of 2.2–2.4 by addition of appropriate amounts of a 10% solution of oxalic acid. This pH was maintained within the just mentioned range during the first step of the reaction. The formaldehyde and furfuryl alcohol were then reacted at about 95° C. for approximately 2 hours. The percent free formaldehyde at this point was about 2.8–3.0% by weight based on weight of the entire reaction mass.

The reaction mass was then cooled to 45° C. and the pH adjusted to 7.2–7.4 by addition of an appropriate amount of 50 weight percent caustic solution. Thereafter the reaction mass was partially dehydrated. The percent free formaldehyde at this point was 4.5–4.6%. 4.17 parts of phenol were then added to the above polymer along with 4% additional caustic based on the weight of the phenol to raise the pH to about 9.5–10.0. The phenol and free formaldehyde present were then reacted at about 85° C. for approximately 3 hours. At this time the free formaldehyde content was less than about 1%. The reaction vessel was cooled to 25° C. yielding a final liquid resin product which had a pH of 7.2–7.4 and a Brookfield viscosity measured at 25° C. falling within the range of 160–190 c.p.s.

EXAMPLE II

This example illustrates preparation of another typical binder of the invention. 1519 pounds of furfuryl alcohol and 398 pounds of a 45% solution of Formalin were charged to a reaction kettle. The pH of the reaction mixture was adjusted to about 2.4 by addition of a 10% solution of oxalic acid. About 3 pounds of the oxalic acid solution was required to bring the pH to the above figure. The reaction mixture was then heated to 95° C. and the pH again adjusted by addition of about 2½ pounds of 10% oxalic acid solution. The reaction was continued at 95° C. until the free formaldehyde content dropped to about 2.8–3.0%. This took approximately three hours of reaction time. The reaction mass was cooled to 70° C. and sufficient 50% caustic added to raise the pH to about 9.5–10.0. About 10 pounds of caustic was required here. 83 pounds of phenol was then added and the reaction mixture again heated to 95° C. The phenol was then reacted with free formaldehyde until the free formaldehyde content dropped to 0.3–0.5%. During this period of time the pH was maintained within the range of 9.5–10.0. The reaction time in the second phase of the process was approximately 2½ hours. The reaction mixture was cooled to about 60° C. and then dehydrated under vacuum. The dehydrated resin was then cooled to about 30° C.

The liquid resin product had a pH at 25° C. of about 7.2, a free formaldehyde content of about 0.4, a viscosity of 25° C. of about 350 c.p.s. and a refractive index at 25° C. of 1.530.

METHOD OF PREPARING SAND CORES

The just described resin is admirably suited as a room temperature curing binder when mixed with a foundry sand. In a greatly preferred embodiment a foundry mix composing a mixture of aggregate material and a binding amount of the here described polymerizable binder also contains a catalyst or acidic accelerator which particularly promotes a room temperature cure. Cores or molds may then be prepared from the foundry mix. Such a foundry mix may optionally contain other ingredients such as iron oxide, ground flax fibers, wood flour, cereal, pitch and the like. The aggregate, for example, sand, is the major constituent and the binder portion constitutes a relatively minor amount, generally less than 10%, and more frequently within the range of from about 0.25% to about 5%, these percentages being based on the weight of the sand. Most often the binder content will range from about 1% to about 3% by weight based on the weight of the sand.

As indicated above, the binder when mixed with sand and accelerator or catalyst cures by chemical reaction without a need for external heating means. Such cure at room temperatures includes both air cure and no-bake types of curing. The room temperature cure is generally effected at temperatures of from about 45° to about 120° F. In most instances the room temperature cure is effected at temperatures of from about 60° F. to about 90° F. It is understood, of course, that the resin binders described herein may also be cured at elevated temperatures, but they are distinguishable from the heat curable binders because of the ability to cure without external heating.

The catalyst or cure accelerators which may be employed here are generally relatively strongly acidic materials capable of catalyzing the polymerization of binder of this invention. Mineral acids such as phosphoric acid, hydrochloric acid, and many organic acids and anhydrides, such as maleic anhydride, trichloro acetic acid, para-toluene sulfonic acid, etc. may be utilized here. Other acidic materials such as ammonium phosphate, carbamide phosphoric acid, hemi-sodium phosphate, ammonium chloride, sodium bisulfate, boron trichloride, ferric trichloride, aluminum trichloride, etc. also have utility as catalyst. Of these, the most preferred acidic accelerators when used in conjunction with the resin binders described here are phosphoric acid or isomers of toluene sulfonic acid, and most preferably the para-toluene sulfonic acid isomer. Crude mixtures of the latter may also be employed with equal facility. The para-toluene sulfonic acid appears to particularly promote increased strength and hardness of molds and cores formed through use of such catalyst.

Usually the amount of accelerator is based on the amount of resin binder utilized in the foundry mix. In a preferred embodiment 2–40% by weight of accelerator or catalyst is employed based on the weight of the resin utilized in the mix. Most preferably 5–30% of catalyst is employed.

In order to form a foundry mix which will be uniformly cured the refractory material, binder and polymerization accelerator should be substantially uniformly mixed. The mixing may take place in any sequence, and may be effected through use of conventional equipment. For example, high-speed foundry mullers may be employed. Likewise, solvents, wetting agents and other expedients may be resorted to in order to carry out uniform blending of the binder, accelerator and refractory material. The binder may be added to the refractory which already contains a catalyst mixed therein. Likewise, the catalyst and refractory may be mixed to which is then added the binder. This latter mode of mixing is preferred.

By way of summary, the foundry cores of the invention are prepared via the following steps:

(1) Form a foundry mix containing aggregate such as sand, binder and polymerization catalyst.

(2) Introduce the foundry mix into a mold or pattern to thereby obtain a green mold.

(3) Allow the green mold to remain in the mold or pattern for a time at least sufficient for the core to obtain a minimum stripping strength, that is, to become self-supporting.

(4) After removing the green core from the mold or pattern allow it to air dry at room temperature, thereby obtaining a hard, solid, cured core.

(5) In an optional step the green core of the invention can be stripped from the mold or pattern and baked to accelerate the cure.

The following example illustrates preparation of a typical sand core of the invention utilizing the resin binders described in detail above. These cores were then tested for their physical properties, and found suitable in all respects in each test utilized.

EXAMPLE III 20,000 grams of silica sand was mulled four minutes with a 58% solution of para-toluene sulfonic acid. The amount of acid catalyst added to the sand was 58 grams (14.5% by weight based on resin binder weight). To the above was then added 400 grams of the resin of Example I (2% by weight of resin based on the weight of the sand), and the entire mix mulled for four minutes. Pyramid test cores were then prepared in the following manner. A core box was placed on top of a jolter and a core box hopper attached. The core box was filled with foundry mix and the assembly jolted. The cores were allowed to remain in the box until sufficient strength had developed to permit stripping. The test cores were then tested for a number of properties as outlined below.

The test methods employed for testing the no-bake foundry sand binders of the invention are generally set out in American Foundry Sand Transactions, volume 70, 1962. The purpose of these tests can be summarized as follows. The moldability index is essentially an indication of flowability. The strip time is that time after mulling which is required before the prepared core is sufficiently hard to be withdrawn from the core box without distortion. The cure time is that time interval after mulling that is required before the core is hard enough to be handled. The working time is that period of time after mulling during which acceptable cores can be made.

Two test cores were prepared as outlined above and tested for their various properties. Results are indicated in Table I below.

TABLE I

| | Resin | |
|---|---|---|
| | I | II |
| | Catalyst | |
| | 7% Para-toluene sulfonic acid based on resin weight | 8.7% Para-toluene sulfonic acid based on resin weight |
| Room temp. | 80 | 74 |
| Sand temp., ° F. | 82 | 80 |
| Relative humidity, percent | 41 | 47 |
| Discharge temp., ° F. | 100 | 90 |
| Maximum temp., No. 1 core ° F. | 100 | 93 |
| Moldability index: | | |
| 1 minute | 84 | 90 |
| 6 minutes | 25 | 71 |
| 11 minutes | | 39 |
| 16 minutes | | |
| 21 minutes | | |
| Strip time, minutes | 34 | 26 |
| Cure time, minutes | 50 | 45 |
| Stripping strength, p.s.i. | 9 | 8 |
| Working time, minutes | 4 | 6 |
| Tensile time: | | |
| 2 hours | 110 | 180 |
| 24 hours | 350 | 250 |
| Scratch hardness: | | |
| 2 hours | 80 | 78 |
| 24 hours | 80 | 75 |

It was interesting to note a number of other resins containing the same three components as are contained in the resins of the invention, namely, furfuryl alcohol, formaldehyde and phenol, were prepared via different routes, and unexpectedly gave substantially poorer results in terms of the above test categories or other indexes of efficiency. For example, in one series of experiments the three components were polymerized using a one step process. Difficulties were encountered in all aspects of performance including poor curing, inferior stripping strength, scratch hardness and tensile strength, and presence of a severe and undesirable formaldehyde odor. In a still further experiment a formaldehyde-phenol resole resin was blended with furfuryl alcohol. Here formaldehyde odor was high and scratch hardness and tensile strength were poor. In a still further experiment a formaldehyde-phenol resole resin was prepared and blended with a furfuryl alcohol polymer, wherein exact proportions of each of the ingredients were utilized as was employed in Example I above. Again, compared to use of the resins of the invention as a binder, cores formed from this non-inventive species had poor scratch hardness and tensile strength. Thus, it is apparent that resins must be carefully prepared as outlined above, and deviation from the procedure of the invention will result in a binder of inferior character in the relative sense.

On the other hand, when the resin binders are prepared according to directions carefully outlined above excellent cores are formed, capable of air drying at room temperature. In particular, when cores are formed utilizing the binders here excellent castings are made. The pinhole problems of conventional air drying binders are essentially eliminated, surface cracks are substantially eliminated, surface contamination is held to a minimum and casting surfaces are generally clean and smooth.

In addition to curability to air dry at room temperature and resistance to pinholing, the binders of the invention have other distinct advantages. These include ability to quickly impart sufficient stripping strength to green cores to thereby allow them to be stripped from the mold or pattern and then to be completely cured while unsupported, thus freeing the mold or pattern for subsequent use; a realistic bench life which generally parallels the curing rate; a curing rate which can be varied from almost instantaneous to any reasonable level, depending upon the choice and amount of catalyst used; ability to impart a high tensile strength to cores; good moisture resistance; ability to impart an excellent level of moldability or plasticability to foundry sand mixes; good breakdown properties; ability to cure in combination with sand containing other types of aggregates commonly used in the foundry art; good breakdown properties; and ability to produce cores which can be easily stripped from a mold or pattern. These and other advantages are obtained, particularly when the best mode of the invention is followed.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A resin useful as a no-bake binder for sand in a foundry process which comprises a three component resin system including furfuryl alcohol, formaldehyde and phenol, said resin having been formed in a sequential two-step process involving:
   (A) reacting 85–95% by weight of furfuryl alcohol and 5–15% by weight of formaldehyde, said percentages being based on the combined weight of said furfuryl alcohol and formaldehyde, said reaction being carried out under acidic conditions and until the free formaldehyde content present in said reaction mass ranges from about 2 to about 5% based on the weight of said reaction mass; and
   (B) reacting said free formaldehyde present after reaction (A) under basic conditions with sufficient phenol to provide a mole ratio of formaldehyde to phenol at the initiation of the reaction of from 2:1 to 3:1.

2. The resin of claim 1 wherein said mole ratio of formaldehyde to phenol at the initiation of the reaction is 2.5–2.9:1.

3. The resin of claim 1 which is prepared by reacting furfuryl alcohol and formaldehyde until the free formaldehyde content, present in said reaction mass is from 2.5 to 4.5% based on the weight of said reaction mass.

4. The resin of claim 1 which is prepared by reacting furfuryl alcohol and formaldehyde in reaction (A) at a pH less than about 3, and by reacting phenol and formaldehyde in reaction (B) at a pH greater than 7.

5. The resin of claim 3 which is prepared by reacting furfuryl alcohol and formaldehyde in reaction (A) at a pH less than 3 and by reacting formaldehyde and phenol in reaction (B) at a pH greater than 7.

6. The resin of claim 5 which is prepared by reacting furfuryl alcohol and formaldehyde in reaction (A) at a pH ranging from about 2 to about 3, and by reacting phenol and formaldehyde in reaction (B) at a pH ranging from about 9 to about 10.

7. The resin of claim 1 which is prepared by reacting furfuryl alcohol and formaldehyde at 80–100° C. for 1–5 hours.

8. The resin of claim 7 which is prepared by reacting formaldehyde and furfuryl alcohol at 90–100° C. for 1–3 hours.

9. The resin of claim 7 which is prepared by reacting phenol and formaldehyde at 80–100° C. for 1–5 hours.

10. The resin of claim 9 which is prepared by reacting formaldehyde and phenol at 90° C.–100° C. for 1–3 hours.

11. A liquid resin useful as a no-bake binder for sand in a foundry process which comprises a three component resin system including furfuryl alcohol, formaldehyde and phenol, said resin having been formed in a sequential two-step process involving:
(A) reacting 70–90% by weight of furfuryl alcohol and 10–30% by weight of formalin containing 35–45% by weight of formaldehyde in water, said percentages being based on the combined weight of said furfuryl alcohol and formalin, said reaction being carried out at a pH ranging from about 2 to about 3 until the free formaldehyde content is 2.5–3.5% by weight based on the weight of said reaction mass; and
(B) reacting said free formaldehyde present after reaction (A) at a pH of 9–10 with phenol, sufficient phenol being added here to provide a mole ratio of formaldehyde to phenol at the initiation of reaction (B) of 2–3 moles of formaldehyde per mole of phenol.

12. The liquid resin of claim 11 which is prepared by reacting 2.5–2.9 moles of formaldehyde per mole of phenol in reaction (B).

13. The resin of claim 11 which is prepared by effecting both reaction (A) and reaction (B) at 80–100° C. for 1–5 hours.

14. A liquid resin useful as a no-bake binder for sand in a foundry process which comprises a three component resin system including furfuryl alcohol, formaldehyde and phenol, said resin having been formed in a sequential two-step process involving:
(A) reacting 70–80 parts by weight of furfuryl alcohol and 15–25 parts by weight of formalin containing 35–45% by weight of formaldehyde in water, said reaction being carried out at a pH ranging from about 2 to about 3 and until the free formaldehyde content present in said reaction mass is 2.5%–3.5% based on the weight of said reaction mass; and
(B) reacting said free formaldehyde present after reaction (A) at a pH of from about 9 to about 10 with 3–10 parts by weight of phenol.

15. The resin of claim 14 which is prepared by adding sufficient phenol in reaction (B) so as to provide a mole ratio of formaldehyde to phenol at the initiation of the reaction of from about 2.5 to about 2.9 moles of formaldehyde per mole of phenol.

16. The resin of claim 15 which is prepared by reacting furfuryl alcohol and formaldehyde in reaction (A) and formaldehyde and phenol in reaction (B) both at a temperature ranging from about 80 to about 100° C. for a period of time ranging from about 1 to 5 hours.

17. The method of making a resin useful as a binder for sand in a foundry process, said resin comprising a three component resin system including furfuryl alcohol, formaldehyde and phenol which comprises the steps of sequentially reacting in a two-step process:
(A) reacting 85 to 95% by weight of furfuryl alcohol and 5–15% by weight of formaldehyde, said percentages being based on the combined weight of furfuryl alcohol and formaldehyde, said reaction being carried out under acidic conditions and until the free formaldehyde content present in said reaction mass ranges from about 2 to about 5% based on the weight of said reaction mass; and
(B) reacting said free formaldehyde present after reaction (A) under basic conditions with sufficient phenol to provide a mole ratio of formaldehyde to phenol at the initiation of the reaction of from 2:1 to 3:1.

18. The method of claim 17 wherein said mole ratio is 2.5–2.9:1.

19. The method of claim 18 wherein the free formaldehyde content present at the end of reaction (A) is 2.5–4.5%.

20. The method of claim 17 wherein reaction (A) is carried out at a pH less than 3 and reaction (B) is carried out at a pH greater than 7.

21. The method of claim 17 wherein reaction (A) is carried out at a pH of 2–3 and at a temperature ranging from about 80 to about 100° C. for 1–5 hours, and reaction (B) is carried out at a pH ranging from about 9 to about 10 and at a temperature ranging from about 80 to about 100° C. for 1–5 hours.

22. A method of making a liquid resin useful as a binder for sand in a foundry process, said resin comprising a three component resin system including furfuryl alcohol, formaldehyde and phenol, which comprises the steps of sequentially reacting in a two-step process:
(A) reacting 70–90% by weight of furfuryl alcohol and 10–30% by weight of formalin containing 35–45% by weight of formaldehyde and water, said percentages being based on the combined weight of said furfuryl alcohol and said formalin, said reaction being carried out at a pH of 2–3, and at a temperature ranging from about 80 to about 100° C. for 1–5 hours until the free formaldehyde content present in said reaction mass is 2.5–4.5% by weight based on the weight of said reaction mass; and
(B) reacting said free formaldehyde present with phenol at a pH of 9–10, and at a temperature ranging from about 80 to about 100° C. over a period of time ranging from about 1 to about 5 hours, sufficient phenol being added here to provide a mole ratio of 2.5–2.9 moles of formaldehyde per mole of phenol.

23. A method of making a liquid resin useful as a binder for sand in a foundry process, said resin comprising a three component resin system including furfuryl alcohol, formaldehyde and phenol, which comprises the steps of sequentially reacting in a two-step process:
(A) reacting 70–80 parts of furfuryl alcohol and 15–25 parts of formalin containing 35–45% by weight of formaldehyde in water at a pH of 2.3, and at a temperature ranging from about 80 to about 100° C. for 1–5 hours until the free formaldehyde content present in said reaction mass is 2.5–4.5% based on the weight of said reaction mass; and
(B) reacting said free formaldehyde present after reaction (A) at a pH of 9–10, and at a temperature ranging about 80° C. to about 100° C. for 1–5 hours with 3–10 parts by weight of phenol.

24. A foundry process which comprises the step of mixing a foundry sand with at least a binding amount of the no-bake binder of claim 11 to thereby form a foundry mix.

25. A foundry process which comprises the step of mixing a foundry sand with at least a binding amount of the no-bake binder of claim 1 to thereby form a foundry mix.

26. A foundry process which comprises the step of mixing a foundry sand with at least a binding amount of the no-bake binder of claim 14 to thereby form a foundry mix.

27. The process of claim 24 wherein a catalytic amount of a catalyst is also mixed with said foundry refractory material to accelerate curing of said binder.

28. The process of claim 26 wherein a catalytic amount of a catalyst is also mixed with said foundry sand to accelerate curing of said binder.

29. The process of claim 24 which further includes the steps of
(1) mixing a catalytic amount of catalyst with said foundry refractory material to accelerate curing of said binder; and
(2) shaping and curing said foundry mix to thereby form a core.

30. The process of claim 26 which further includes the steps of
(1) mixing a catalytic amount of catalyst with said foundry sand to accelerate curing of said binder; and
(2) shaping and curing said foundry mix to thereby form a core.

31. A cured foundry core comprising a foundry refractory material and a binding amount of from 0.25 to 5% by weight based on the weight of said foundry refractory material of a binder composition before curing; said binder composition consisting of
(a) the resin of claim 1; and
(b) at least a catalytic amount of a catalyst to accelerate curing of said resin.

32. The core of claim 31 wherein said catalyst is para-toluene sulfonic acid.

33. The core of claim 31 wherein said catalyst is present in an amount ranging from about 2% by weight to about 40% by weight based on the resin weight.

34. A cured foundry core comprising sand and a binding amount of from 0.25 to 5% by weight based on the weight of said sand of a binder composition before curing; said binder composition consisting of
(a) the resin of claim 14; and
(b) at least a catalytic amount of a catalyst to accelerate curing of said resin.

35. The core of claim 34 wherein said catalyst is para-toluene sulfonic acid.

36. The core of claim 34 wherein said catalyst is present in an amount ranging from about 2% to about 40% by weight based on resin weight.

37. A process for making cores composed principally of sand which comprises preparing the resin binder of claim 31, adding said binder and an acidic accelerator therefor to sand in quantities sufficient to form said core, agitating the mixture to effect thorough dissemination of the binder and accelerator through the sand, packing the disseminated mass to form a core, and allowing the core to cure without the application of any extraneous heat.

38. The process of claim 37 wherein said acidic accelerator is prepared from para-toluene sulfonic acid.

39. The process of claim 37 wherein said acidic accelerator is present in an amount ranging from about 2% to about 40% by weight based on the weight of said resin binder.

40. A process for making cores composed principally of sand which comprises preparing the resin binder of claim 14, adding said binder and an acidic accelerator therefor to sand in quantities sufficient to form said core, agitating the mixture to effect thorough dissemination of the binder and accelerator through the sand, packing the disseminated mass to form a core, and allowing the core to cure without the application of any extraneous heat.

41. The process of claim 40 wherein said acidic accelerator is prepared from para-toluene sulfonic acid.

42. The process of claim 40 wherein said acidic accelerator is present in an amount ranging from about 2% to about 40% by weight based on resin weight.

References Cited
UNITED STATES PATENTS

| | | | |
|---|---|---|---|
| 2,471,631 | 5/1949 | Lebach | 260—829 |
| 3,063,959 | 11/1962 | Lorentz | 260—838 |

ALLAN LIEBERMAN, Primary Examiner

S. M. PERSON, Assistant Examiner

U.S. Cl. X.R.

164—349; 260—829, 838